United States Patent [19]

Ciarniello et al.

[11] 4,132,881
[45] Jan. 2, 1979

[54] ELECTRICALLY HEATED VEHICLE WINDOW HAVING PLURAL MOISTURE SENSING PROBES

[75] Inventors: Giorgio Ciarniello, Vasto; Oscar De Lena, Termoli, both of Italy

[73] Assignee: Societa Italiana Vetro SIV S.p.A., Vasto (Chieti), Italy

[21] Appl. No.: 806,937

[22] Filed: Jun. 15, 1977

Related U.S. Application Data

[62] Division of Ser. No. 531,098, Dec. 9, 1974, Pat. No. 4,048,469.

[30] Foreign Application Priority Data

Dec. 12, 1973 [IT] Italy ............................... 54277 A/73

[51] Int. Cl.² .......................... H05B 3/06; E06B 7/12
[52] U.S. Cl. .................. 219/203; 15/250.05;
73/73; 200/61.05; 219/522; 219/543; 219/547;
318/483; 338/35
[58] Field of Search ............... 219/522, 547, 543, 203,
219/490; 52/171; 338/35; 73/73;
200/61.05–61.07; 340/234, 235; 318/483;
15/250.05, 250.12

[56] References Cited

U.S. PATENT DOCUMENTS

| | | | |
|---|---|---|---|
| 3,330,942 | 7/1967 | Whitson | 219/522 |
| 3,749,885 | 7/1973 | Nagasima | 219/522 |
| 3,864,659 | 2/1975 | Furuuchi et al. | 200/61.06 X |
| 3,868,492 | 2/1975 | Taylor | 219/203 |
| 4,032,745 | 6/1977 | Roselli | 219/522 X |
| 4,048,469 | 9/1977 | Ciarniello et al. | 219/203 |

*Primary Examiner*—A. Bartis
*Attorney, Agent, or Firm*—Browdy and Neimark

[57] ABSTRACT

The glass pane of a vehicle window is provided on the surface of its central viewing area with a plurality of spaced, parallel linear heating resistors. First and second buses, disposed laterally of the central viewing area, extend transversely of the resistors and supply electric power thereto. A pair of moisture sensing, electrically conductive probes are provided on the pane at widely spaced zones away from the central viewing area. Each probe includes a first portion coextensive in length with a resistor and running parallel thereto. At least one of the probes has a second portion running parallel to one of the buses.

5 Claims, 6 Drawing Figures

4,132,881

ELECTRICALLY HEATED VEHICLE WINDOW HAVING PLURAL MOISTURE SENSING PROBES

CROSS-REFERENCE TO RELATED APPLICATION

This application is a division of the co-pending application of Giorgio Ciarniello et al entitled AUTOMATIC CONTROL DEVICE FOR THE DEFOGGING CIRCUITS OF GLASS PANES filed Dec. 9, 1974 under Ser. No. 531,098, issued on Sept. 13, 1977 as U.S. Pat. No. 4,048,469, which is incorporated herein in its entirety by reference.

BACKGROUND OF THE INVENTION

This invention relates to a window pane provided with a plurality of heating resistors and moisture-sensing probes. The invention is particular useful in operative association with a circuit arrangement for automatically controlling the heating circuit of the glass pane, i.e., in association with a circuit arrangement which automatically switches the heating circuit on when the glass pane becomes fogged and switches it off once the transparency of the pane has been restored. It is known that glass panes equipped with an electric heating system have many industrial and civil uses. In its use on vehicles (motorcars, airplanes, ships), the electric heating has the purpose of freeing the external surface of the glass pane from snow or ice and its internal surface from fogging caused by the condensation of water vapor upon it.

SUMMARY OF THE INVENTION

The window pane of the present invention in association with the circuit arrangement provides for the automatic control of the electric heating system of the glass pane, which automatically switches the circuit on when the fogging of the glass pane attains a predetermined degree, and switches it automatically off as soon as the fogging of said glass pane is reduced under a given limit.

Therefore, the window pane of the invention in association with the circuit arrangement not only eliminates the need for a manual control of the heating system, but also greatly reduces the consumption of electric power.

The combination of the window pane and circuit arrangement is especially intended for the defogging of the rear windows of motor vehicles. The window pane is provided with probes of such a length and position as to control practically the whole area of said rear window and a control circuit which is piloted by the probes to connect and disconnect the heating circuit of said windows from the power supply.

According to another feature, the control circuits are miniaturized in such a manner as to be directly applicable to said rear window, thus avoiding, during the construction and fitting of the window, the complicated work of the electrical connections between said rear window and the electric system of the vehicle.

These control circuits may be either of the ON-OFF type, which comprises an electromechanical or electronic ON-OFF relay which switches the heating system of the glass pane on when a predetermined upper fogginess level is exceeded and switches it off as soon as a predetermined lower fogginess level is attained. Or else, it may comprise an electronic relay of the proportional type, which switches the heating system on when the plass pane is fogged beyond a given upper level and regulates the current supply to the heating system proportionally to the degree of fogginess of the glass pane, and switches the heating system off when the fogginess of the glass pane sinks under a predetermined lower level. The control circuit, being miniaturized, can always be applied to the glass pane. The electromechanical types of relays are applicable outside the glass pane, while the two types of electronic relays, owing to their extremely small size, are conveniently applied on the glass pane.

BRIEF DESCRIPTION OF THE DRAWINGS

Some embodiments of the invention will now be described with reference to the attached drawings for a purely illustrative and in no way limitative purpose. In the drawings.

DESCRIPTION OF THE PREFERRED EMBODIMENTS

Figure 1:
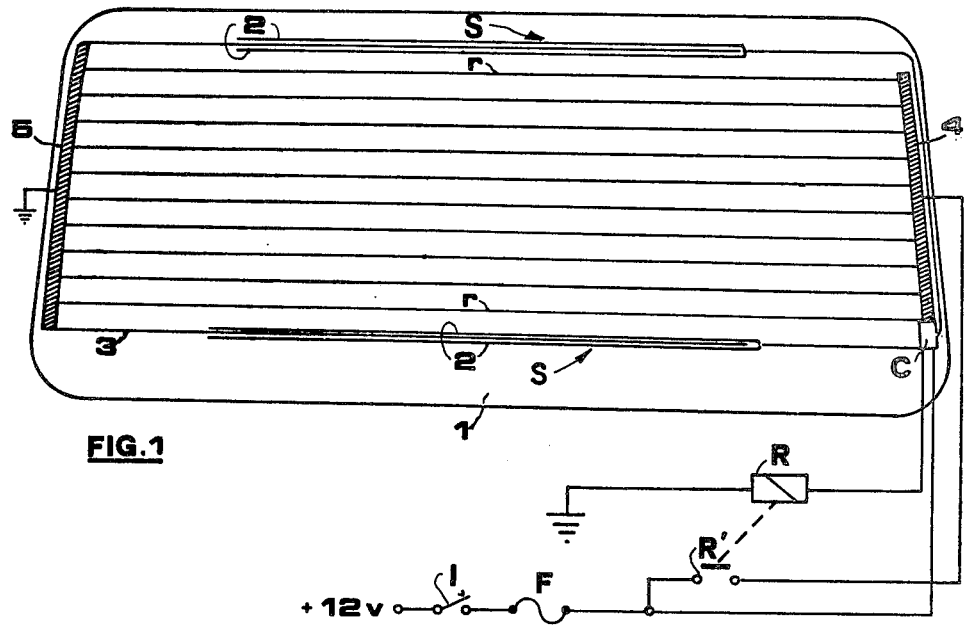
FIG. 1 shows a rear window for a motorcar, fitted with the heating circuit and the automatic control device comprising an electromagnetic relay.
Figure 2:
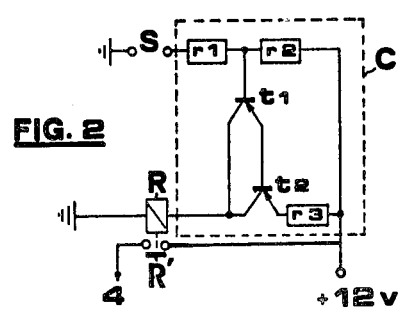
FIG. 2 shows the wiring diagram of a control circuit.

With reference to FIGS. 1 and 2, a heating circuit of a glass pane 1 of a rear window includes an array of parallel-connected resistors r, connected on one end with the positive terminal of a power supply and at the other end with ground of the power supply. An upper and a lower probe S extends parallel to the resistors r for a stretch approximately equal to their length, so as to detect fogging on those areas where it occurs more readily. The probes of FIGS. 1 and 2 include two parallelly running wires 2 connected to the positive terminal of the power supply, and a wire 3 extending between the wires 2 and connected with the ground. Contact between the wires 2 and 3 and consequently the passage of current through them is established by formation of water droplets between them.

The geometric arrangement of the probes in the above described manner effect an optimum and wide response of the device to fog formation. In fact, if merely a small area of the glass pane is involved by the fog formation, even if it includes within its limits a small portion of one or the other of the probes, it will not cause within that probe a passage of current such as to exceed the threshold value necessary for actuating the heating system, since only a very small amount of current passes between the wires 2 and 3. On the other hand, if the area where the fog forms involves a greater portion of either of the two probes, the current will attain a level, which exceeds the threshold level of the control device, which will therefore be actuated.

The length of the probes S and their arrangement on the glass pane permits them not only to sense, notwithstanding their extreme thinness, those areas of the rear window which are most exposed to fog formation, but also permits one to accurately adjust the response level of the control circuit. This result could not be obtained with the known probes, which are of a small bidimensional, generally square shape. Thus, they not only control a very small area of the rear window, but, being completely wetted by any degree and extension of the fog formed on the glass pane, they are unable to differentiate the current sufficiently to permit a regulation of the response level of the relays of the control circuit.

A further advantage of the invention is that the conductors of the probes may be produced by the same process, such as the silk screen process, used for applying the resistors r of the heating system, and also permits those probes to be connected with the same method used for the heating elements r, for instance through a single conductor, which may be similarly applied to the glass pane by the silk screen process.

FIG. 2 shows the wiring diagram of the control circuit proper C. It consists of a Darlington circuit comprising two transistors $t_1$ and $t_2$, the base of transistor $t_2$ being connected with the emitter of the transistor $t_1$ while the base of transistor $t_1$ is connected with the positive terminal of the power supply by a resistor $r_2$ and the emitter of the transistor $t_2$ is connected with said positive terminal through a resistor $r_3$. The collectors of the transistors $t_1$ and $t_2$ are interconnected and this junction is connected to one terminal of an electromagnetic relay R, whose other terminal is grounded. One end of the probes S is grounded, while their other end is connected with the base of the transistor $t_1$ through a resistor $r_1$. A master switch I and a fuse F are inserted between the positive terminal of the power supply and the control circuit.

When a current exceeding a given predetermined response threshold passes through the electrodes 2 and 3 of one or both of the probes S, the coil of the electromagnetic relay R will be energized so that its contact $R_1$ will connect the positive terminal of the power source with one of the collectors 4 of the resistors r of the heating system, the other collector 5 of said heating system being permanently connected to the ground. As soon as the current through the electrodes 2 and 3 of the probes S sinks below said response threshold, the contact $R_1$ will disconnect the heating system from the positive terminal of the power source.

As stated, the Darlington circuit C may be miniaturized and applied directly to one corner of the glass pane, as indicated in the FIG. 1, while the electromechanical relay R may be positioned outside the glass pane.

Figure 3:
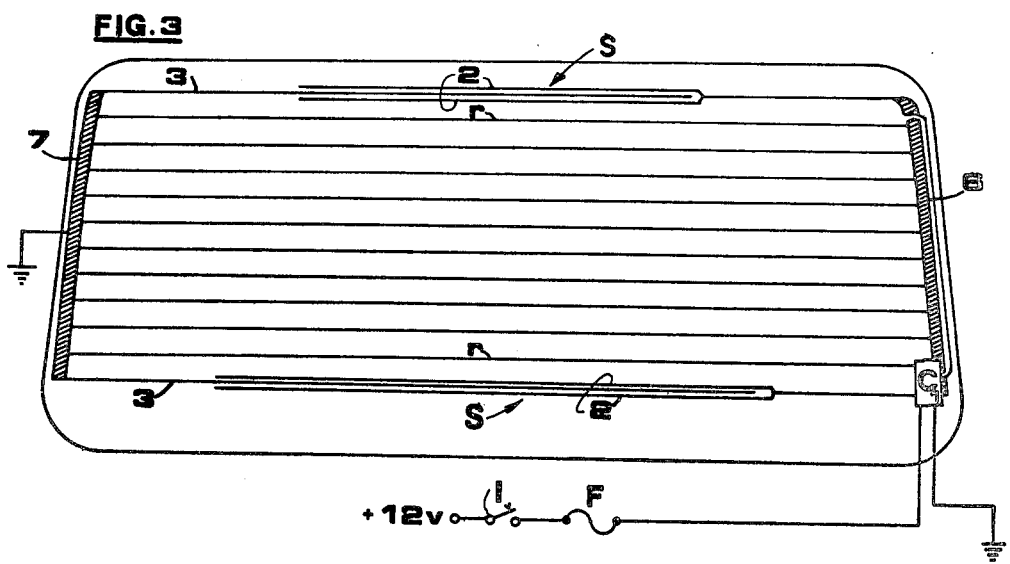
FIG. 3 shows a motorcar rear window with a control device comprising an electronic relay.
Figure 4:
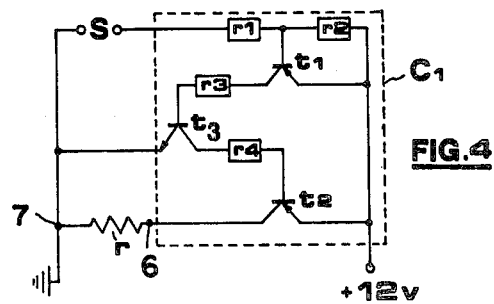
FIG. 4 shows the wiring diagram of the control circuit of the latter embodiment.

FIGS. 3 and 4 show a simplified embodiment of the device. This embodiment permits to replace the electromechanical relay with an electronic relay, the whole being directly applicable to the glass pane of the rear window, as indicated at C' in FIG. 3.

The control circuit shown in FIG. 4 includes three transistors $t_1$, $t_2$ and $t_3$. The first and second transistors $t_1$ and $t_2$ have their respective emitters connected to the positive terminal of the power source, the transistor $t_1$ having its base connected to the positive terminal through a first resistor $r_2$ and to one end of said probe S through a second resistor $r_1$, while its collector is connected through a third resistor $r_3$ to the base of the third transistor $t_3$, said third transistor $t_3$ having its collector connected to the base of said second transistor $t_2$ through a fourth resistor $r_4$ and its emitter connected to ground, the second transistor $t_2$ having its collector connected with one terminal 6 of the defogging circuit, the other terminal 7 of the defogging circuit being connected to ground. When a given threshold value of the current passing through the electrodes 2 and 3 has been attained or exceeded, the current heating the resistors r will be proportional to the magnitude of the current passing through the electrodes of the probes S. In this embodiment, only one wire is required to connect this system with the positive terminal and one conductor to connect it with the ground.

In this embodiment, the current requirements are proportional to the degree of fogginess of the window pane, which permits a considerable saving of electric power.

Both embodiments are easy to install. The embodiment shown in FIGS. 1 and 2 has the advantage that in case of a failure of the circuit C, the latter may be excluded by blocking the contact R' in the "make" position and controlling the heating circuit manually through the switch I. The embodiment of FIGS. 3 and 4 has the advantage of eliminating the electromagnetic switch with all its disadvantages, such as chatter, bounce and sparking, permits space saving and the elimination of the conductors between the relay and the control circuit $C_1$.

Furthermore, the automatic defogging device may be installed in existing motor vehicles without any substantial change in their circuitry, and the sensitivity of the device to fog formation may be preliminarily determined during the drafting stage.

Figure 5:
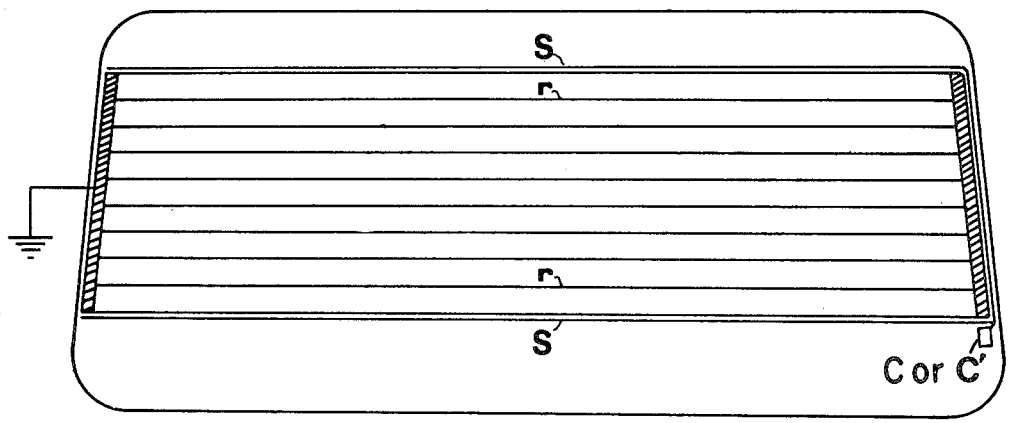
FIG. 5 shows a motorcar rear window with a different type of probe.

FIG. 5 shows a different embodiment of the probes. Each probe consists of a single conductor, which runs parallel and adjacently to one of the resistors R of the heating system. One end of this conductor is connected with the control circuit C or C', while the other adjacent resistor forms the other electrode.

Figure 6:
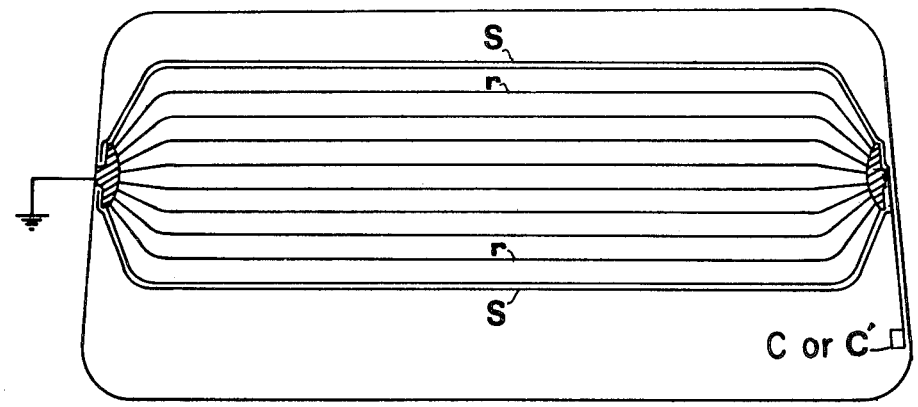
FIG. 6 shows a different arrangement of the heating elements of a rear window with its relating probes.

FIG. 6 shows the application of the invention having a different arrangement of the heating resistors. Also in this embodiment, the probes are formed of a single conductor running parallel and adjacently to the outermost resistors. The embodiments of FIGS. 5 and 6 use the $C_1$ or C type control circuit.

Both the probes and the heating elements may be applied upon the glass panel in a single silk screen process, this type of process being known per se. The device of the invention may also be applied to heating circuits, wherein the heating elements consist of a continuous layer of conducting material.

It is obvious that the present invention is not limited to the shape, number, size, and arrangement of the probes and to the particular control circuit shown in the here illustrated embodiments, and it is further understood that the invention is not restricted to its application to the glass panes, particularly rear windows, of motorcars. Furthermore, the invention may be applicable to any surface which is subject to fogging or ice formation.

What is claimed is:
1. A defoggable window comprising:
a pane having a central viewing area;
a plurality of spaced generally parallel elongated heating resistors disposed on a surface of said central viewing area of said pane;
a first bus and a second bus disposed on said surface of said pane laterally of said central viewing area and connected to the respective ends of said resistors;
a plurality of electrically conductive, moisture-sensing probes spaced apart from each other and from said central viewing area at widely spaced zones on said pane, at least one of said probes including a conductive member disposed on a surface of said pane and having at least a portion thereof running substantially parallel to and closely spaced from one of said buses, each of said probes having at least a portion running substantially parallel to said heating resistors, said probes each having its repective latter said parallel running portion of a length approximately the length of said heating resistors and each of said probes being sensitive to fogging of said pane in its immediate vicinity.

2. A defoggable window according to claim 1, wherein each said probe comprises a conductor extending parallel and in adjacently and spaced relation to one of said heating resistors.

3. A defoggable window according to claim 1, wherein each said probe comprises two closely spaced parallel conductors electrically connected together and a third conductor extending parallel and between said two conductors and spaced therefrom.

4. A defoggable window according to claim 1, wherein each said probe comprises a conductor extending parallel and in adjacently and spaced relation to one of said heating resistors.

5. A defoggable window according to claim 1, wherein one of said probes extends along said pane in the vicinity of its upper portion and another of said probes extends along said pane in vicinity of its lower portion.

* * * * *